(12) United States Patent
Møller (10) Patent No.: US 8,286,627 B2
(45) Date of Patent: Oct. 16, 2012

(54) SOLAR COLLECTOR

(75) Inventor: Brent Møller, Gentofte (DK)

(73) Assignee: VKR Holding A/S, Horsholm (DK)

( * ) Notice: Subject to any disclaimer, the term of this patent is extended or adjusted under 35 U.S.C. 154(b) by 1121 days.

(21) Appl. No.: 11/993,002

(22) PCT Filed: Jun. 20, 2006

(86) PCT No.: PCT/EP2006/005896
§ 371 (c)(1),
(2), (4) Date: Dec. 18, 2007

(87) PCT Pub. No.: WO2006/136365
PCT Pub. Date: Dec. 28, 2006

(65) Prior Publication Data
US 2010/0212657 A1 Aug. 26, 2010

(30) Foreign Application Priority Data
Jun. 24, 2005 (DK) .............................. PA 2005 00933

(51) Int. Cl.
*F24J 2/46* (2006.01)
(52) U.S. Cl. ........................................ 126/704; 126/705
(58) Field of Classification Search .................. 126/704, 126/705
See application file for complete search history.

(56) References Cited

U.S. PATENT DOCUMENTS

| | | | | |
|---|---|---|---|---|
| 3,705,470 A * | 12/1972 | Kent | ................................ | 52/208 |
| 3,972,317 A * | 8/1976 | Gallagher | ...................... | 126/661 |
| 4,010,733 A * | 3/1977 | Moore | ........................... | 126/670 |
| 4,073,097 A * | 2/1978 | Jentoft et al. | ...................... | 52/22 |
| 4,112,918 A * | 9/1978 | Palkes | ............................. | 126/596 |
| 4,122,829 A * | 10/1978 | Lowe et al. | ..................... | 126/651 |
| 4,147,156 A * | 4/1979 | Hopper | ........................... | 126/662 |
| 4,178,909 A * | 12/1979 | Goolsby et al. | ................ | 126/660 |
| 4,201,190 A * | 5/1980 | Bowen | ........................... | 126/704 |
| 4,214,575 A * | 7/1980 | Hopper | ........................... | 126/710 |
| 4,240,407 A | 12/1980 | Spencer | | |
| 4,252,109 A * | 2/1981 | Newton | ........................ | 126/705 |
| 4,261,330 A | 4/1981 | Reinisch et al. | | |
| 4,266,383 A * | 5/1981 | Krueger et al. | .......... | 52/204.597 |
| 4,278,070 A * | 7/1981 | Bowen | ........................... | 126/704 |
| 4,278,072 A * | 7/1981 | Ryan et al. | ..................... | 126/632 |

(Continued)

FOREIGN PATENT DOCUMENTS

DE 3110492 A1 1/1983

(Continued)

*Primary Examiner* — Kenneth Rinehart
*Assistant Examiner* — Jorge Pereiro
(74) *Attorney, Agent, or Firm* — K. David Crockett, Esq.; Niky Economy Syrengelas, Esq.; Crockett & Crockett, PC (57) ABSTRACT

A glazed solar collector with a frame surrounding an absorber. The frame is provided with an inwardly and/or outwardly directed attachment ledge (1a) to which the glazing(4) is attached. A protective Stripping (9) covers the edges of the cover pane(4) and is provided with a ledge (9b) that rests on the attachment ledge (1a). The side- and end panels (1) of the frame include an inwardly projecting bottom ledge (1b) to which a backsheet(5) may be attached by means of welding or TOXing(22). The bottom ledge (Ib) also includes an outwardly projecting ledge that is provided with spaced through going bores along the length of the side- and end panels for i-eceiving fasteners (20) therein that allow the collector to be fastened to a roof structure (19) or the like.

16 Claims, 6 Drawing Sheets

U.S. PATENT DOCUMENTS

| | | | |
|---|---|---|---|
| 4,338,921 A * | 7/1982 | Harder et al. | 126/659 |
| 4,341,200 A * | 7/1982 | Bowen | 126/704 |
| 4,351,137 A * | 9/1982 | Enyart et al. | 52/202 |
| 4,361,134 A * | 11/1982 | Bowen | 126/705 |
| 4,378,789 A * | 4/1983 | Vironneau | 126/654 |
| 4,406,279 A * | 9/1983 | Kohli | 126/705 |
| 4,426,999 A * | 1/1984 | Evans et al. | 126/669 |
| 4,433,674 A * | 2/1984 | Gilleland | 126/659 |
| 4,471,764 A * | 9/1984 | Calvert et al. | 126/704 |
| 4,498,265 A * | 2/1985 | Leflar et al. | 52/204.591 |
| 4,505,511 A * | 3/1985 | Hanle et al. | 296/93 |
| 4,535,756 A * | 8/1985 | Rinehart et al. | 126/710 |
| 5,299,396 A * | 4/1994 | Rap et al. | 52/90.1 |
| 5,578,142 A * | 11/1996 | Hattori et al. | 136/251 |
| 5,960,790 A * | 10/1999 | Rich | 126/623 |
| 6,012,449 A * | 1/2000 | Schulz | 126/621 |
| 6,172,295 B1 * | 1/2001 | Hattori et al. | 136/251 |
| 6,202,373 B1 * | 3/2001 | Lindgren | 52/200 |
| 6,269,596 B1 * | 8/2001 | Ohtsuka et al. | 52/173.3 |
| 6,370,828 B1 * | 4/2002 | Genschorek | 52/200 |
| 6,640,508 B2 * | 11/2003 | Lindgren et al. | 52/200 |
| 6,748,638 B2 * | 6/2004 | Dedrich et al. | 29/281.6 |
| 6,922,951 B1 * | 8/2005 | Inzeo et al. | 52/94 |
| 7,331,145 B2 * | 2/2008 | Feucht et al. | 52/58 |
| 2002/0095884 A1 * | 7/2002 | Lindgren et al. | 52/200 |
| 2002/0095886 A1 * | 7/2002 | Lindgren et al. | 52/204.1 |
| 2003/0192256 A1 * | 10/2003 | Dedrich et al. | 49/404 |
| 2004/0139669 A1 * | 7/2004 | Feucht et al. | 52/204.1 |
| 2009/0114209 A1 * | 5/2009 | Moller et al. | 126/569 |

FOREIGN PATENT DOCUMENTS

| | | |
|---|---|---|
| DE | 10321422 A1 | 1/2005 |
| EP | 537425 A1 * | 4/1993 |
| EP | 618411 A2 * | 10/1994 |
| EP | 0674141 A2 | 9/1995 |
| EP | 1043549 A | 10/2000 |
| FR | 2516133 | 5/1983 |
| WO | WO2004111550 A | 12/2004 |
| WO | WO 2004111550 A1 * | 12/2004 |

* cited by examiner

SOLAR COLLECTOR

The present invention relates to glazed solar collectors and methods for producing such collectors. Such solar collectors typically have a rectangular frame containing an absorber, an insulating layer beneath the absorber, and a cover pane spaced above the absorber. The collectors are particularly suitable to be integrated into a pitched roof, but may also be installed on a flat roof by means of a mounting frame.

BACKGROUND ART

Numerous types of flat plate collector panel assemblies have been devised for solar installations. In flat plate collectors, customarily an absorber plate is deployed which is suitably comprised of steel, aluminum or copper plate coated with a mat black paint and characterized by its ability to absorb radiant energy and convert it to heat. The absorber plate is covered by a cover pane in order to reduce the heat loss from the plate without a corresponding reduction in the heat input due to the selective transmittance of the sun's rays by the glass or glazing. A thermal fluid, such as water, is circulated as a conducting medium in thermal contact with the absorber plate to remove some of the heat absorbed by the plate and this is typically done through the utilization of spaced parallel tubes mounted on the rear side of the absorber plate. The fluid-circulating tubes are connected to a common supply header at one end of the plate and to a return header at another end for transferring the thermal fluid from the tubing into a suitable heat storage area. An insulating layer is disposed beneath the absorber plate and additional insulating layers may be disposed in surrounding relation to the absorber plate. The entire collector is assembled within a frame or tray generally comprised of a flat bottom and metal or wooden outer side- and end panels.

The edges of the cover pane are covered by protective stripping or so called cap stripping to prevent them from being damaged during handling, mounting and whilst installed on a roof. The protective stripping is usually formed by an L-shaped profile that includes an upper ledge covering the peripheral upper surface of the cover pane and a downwardly projecting portion.

In most of the known constructions the protective stripping holds the cover pane in place relative to the collector frame. The protective stripping is retained by means of bolts, screws or similar fasteners, although snap fit systems have also been used.

It is therefore proposed to provide a solar collector for in-roof mounting that is robust, easy to manufacture and install.

DISCLOSURE OF THE INVENTION

On this background, it is an object of the present invention to provide an improved solar collector. This object is achieved in accordance with claim 1 by providing a solar collector comprising an absorber, an insulating layer beneath the absorber, a cover pane spaced above the absorber, an outer frame having end- and side panels surrounding the periphery of the insulating layer, a cover pane attachment ledge directed inwardly and/or outwardly from the end- and side panels adjacent to their upper ends, and a protective stripping with a top ledge covering the a peripheral zone of the upper side of the cover pane and a bottom ledge resting on the attachment ledge.

The protective stripping with a top- and a bottom ledge allows the use of end- and side panels that include at their top an inwardly and/or outwardly projecting attachment ledge that supports both the cover pane and the protective stripping. Thus, a robust and easy to manufacture solar collector is obtained.

The top ledge and the bottom ledge can be interconnected by a substantially horizontally extending connection portion. The bottom ledge may be fastened to the attachment ledge.

The protective stripping may comprise an outwardly facing U-shaped recess for receiving a part of a flashing therein. This allows the flashing to become an integral part of the solar collector. The flashing may include an inwardly directed top ledge, a shoulder, and a substantially upright connecting portion connecting the top ledge with the shoulder.

The shoulder may be supported by the bottom ledge of the protective stripping, to provide a stable flashing.

The connecting portion of the flashing may extend in parallel with the connecting portion of the protective stripping with a given clearance therebetween so as to provide space for fastening elements that fasten the bottom ledge of the protective stripping to the attachment ledge of the end- or side panel. The flashing further includes a skirt projecting downwardly from the shoulder. The inner perimeter of the inwardly directed top ledge of the flashing may be received in the U-shaped recess.

The cover pane can advantageously be attached to the outer frame by a continuous layer of flexible adhesive sealant between a peripheral zone on the underside of the cover panel and the upper surface of the ledge. This allows the cover pane to become an integral and bearing part of the solar collector, without differences in the rate of thermal expansion leading to unacceptable mechanical stress in the frame or the cover pane.

It is another object of the invention to provide a solar collector in which the backsheet can be easily fastened to the frame. This object is achieved in accordance with claim 14 by a collector comprising an absorber, an insulating layer beneath the absorber, a cover pane spaced above the absorber, an outer frame having end- and side panels surrounding the periphery of the insulating layer, a backsheet disposed under the insulation layer, a cover pane attachment ledge directed inwardly and/or outwardly from the end- and side panels adjacent to their upper ends, and a back sheet attachment ledge directed inwardly from the side panels and extending substantially further inwardly then the cover pane attachment ledge, so as to allow for a substantially C-shaped fastening or welding tool to engage the upper side of the back sheet and the underside of the back sheet attachment ledge simultaneously. The backsheet can be connected to the bottom ledge by TOXING, welding, or pop-riveting.

The end- and side panels may further include an inwardly projecting guiding ledge disposed just above the bottom ledge to form a recess therebetween for receiving a periphery of the backsheet therein. The guiding ledge may include an upwardly sloping tip for facilitating the entry of a periphery of a backsheet in the recess.

It is yet another object of the invention to provide a solar collector that can be easily fastened to a roof structure. This object is achieved by a collector comprising solar collector comprising an absorber, an insulating layer beneath the absorber, a cover pane spaced above the absorber, an outer frame having side panels surrounding the periphery of the insulating layer, an outwardly directed bottom ledge provided with spaced through going bores for receiving fasteners therein for fastening the collector to a roof construction there below.

Further objects, features, advantages and properties of the solar collector according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

The preferred embodiment of the invention will be described specifically with reference to a flat plate collector assembly although it is understood that other absorber types may be employed with a minimum change in construction.

Figure 1:
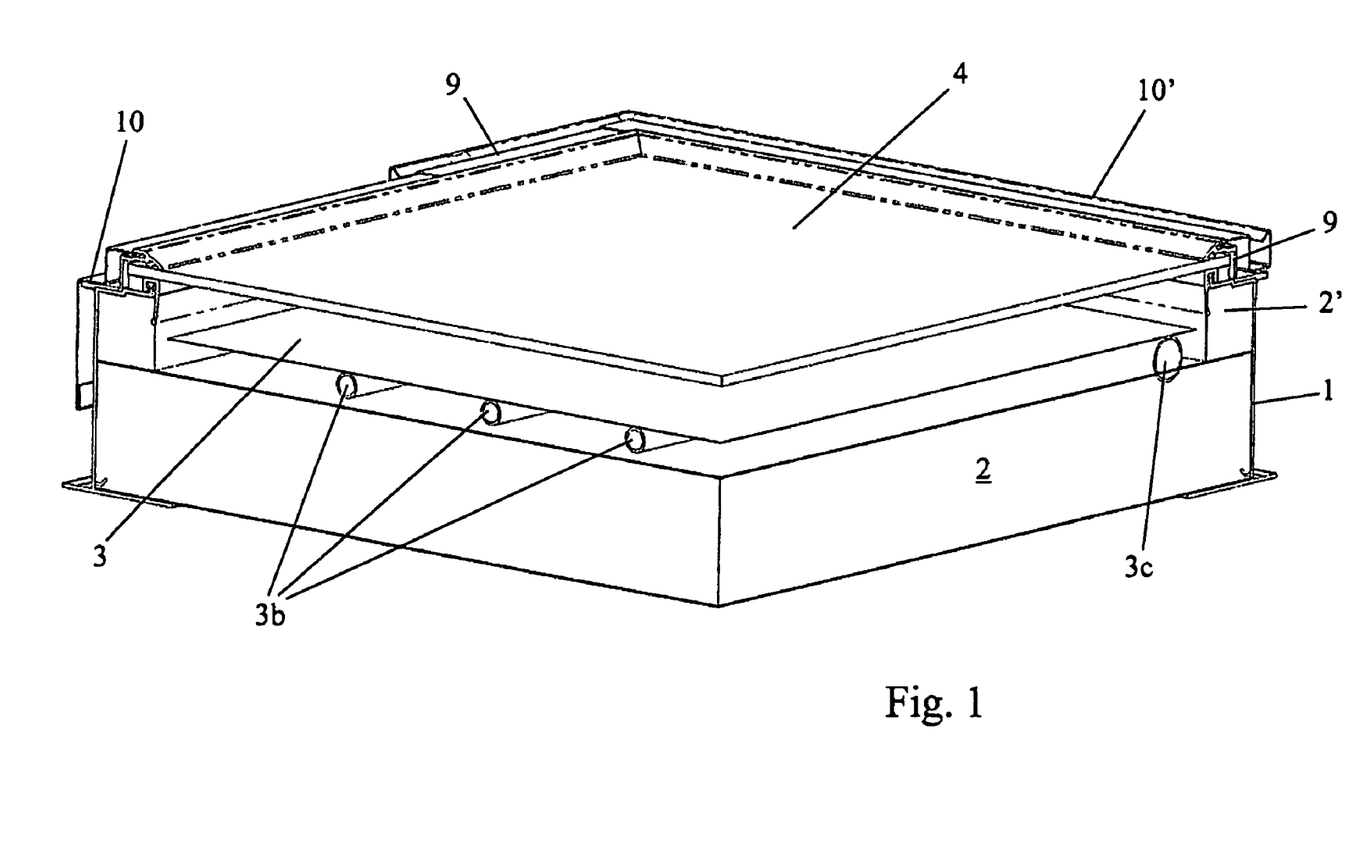
FIG. 1 is a perspective cutaway view of a solar collector in accordance with the present invention.
Figure 2:
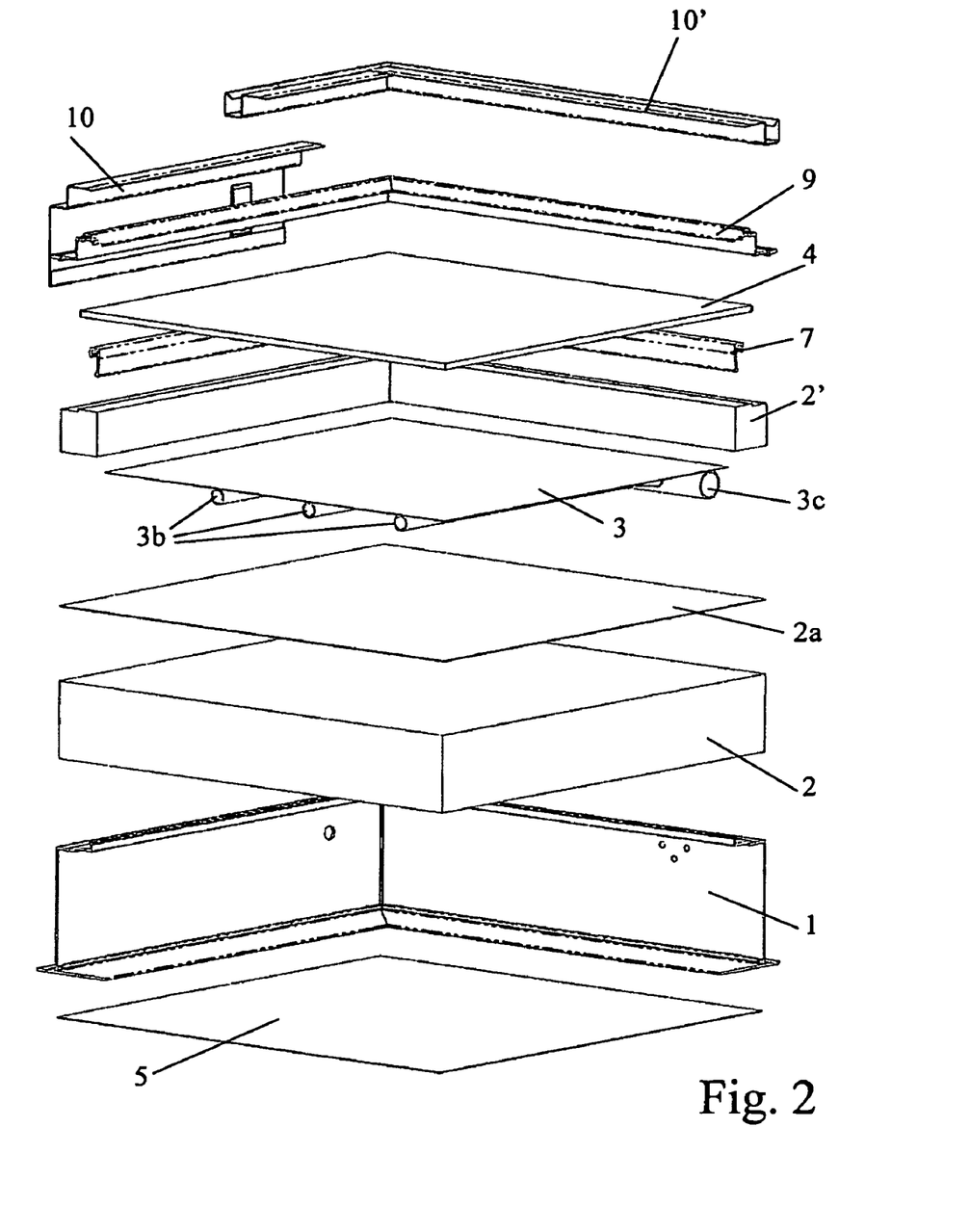
FIG. 2 is an exploded view of FIG. 1.

FIG. 1 shows by way of illustrative example a flat plate solar energy collector, whilst FIG. 2 is the corresponding exploded view. Seen in cutaway perspective view of FIGS. 1 and 2 the solar collector has a frame, an insulation layer 2, an absorber plate 3a and a cover pane 4. The frame, the insulation layer 2 and the cover pane 4 form a case with an enclosure. The enclosure is used to provide support for the absorber plate 3a, and to protect the collector from heat loss due to wind, plus the important function of keeping moisture from rain, snow and dew out of the collector.

The frame includes a backsheet 5 and outer side- and end panels 1. The insulation layer 2 is formed by a mat of mineral- or glass wool material, but could also be formed by a layer of rigid foam urethane (PUR) or polyisocyanurate (PIR). All these materials have an excellent insulation value per unit of thickness and are easy to handle because they are very light The upper surface of the insulation layer 2 is covered with a reflective silver foil 2a.

Additional insulating layers 2' are disposed in surrounding relation to the absorber plate 3a.

The backsheet 5 protects the insulation layer 2 from weather influences and increases the rigidity of the construction. The backsheet 5 is suitably formed of metal, i.e. steel or aluminum.

The absorber comprises an absorber plate 3a and absorber tubing 3b, 3c that channels the medium, typically water, used to transport the collected thermal energy. The absorber plate 3a and the tubing 3b,3c may suitably consist of steel, copper or aluminum sheet or tubing, respectively. The absorber plate 3a and tubing 3b,3c penetrating the casing are thermally insulated from the casing at all points of support.

The absorber plate 3a is provided with a semi-selective or a selective coating to improve the heat absorbing capacity of the absorber plate 3a.

The absorber tubing is attached to the rear side of the absorber plate by a suitable technique, such as welding or soldering and includes two tubes 3c with a larger diameter extending along two opposite edges of the absorber plate 3a. The two tubes 3c interconnected by a plurality spaced parallel lesser diameter tubes 3b extending between the large diameter tubes in a direction substantially transverse to the large diameter tubes 3c. Although not shown, all tubing 3b and 3c may be of equal diameter.

The two larger diameter tubes 3c are connected via sections of flexible tubing (not shown) to an inlet header (not shown) and an outlet header (not shown), respectively. The flexible tubing sections ensure that the absorber plate 3a and absorber tubing 3c can thermally expand and contract without any tension building up at the connection between the absorber tubing 3b,3c and the frame.

The frame comprises four panels 1—two side panels and two end panels—that are part of one extruded profile. The profile is preferably made of aluminum, and notched at the corners of the frame to allow a rectangular frame to be formed by folding of a single extruded profile.

Figure 3:
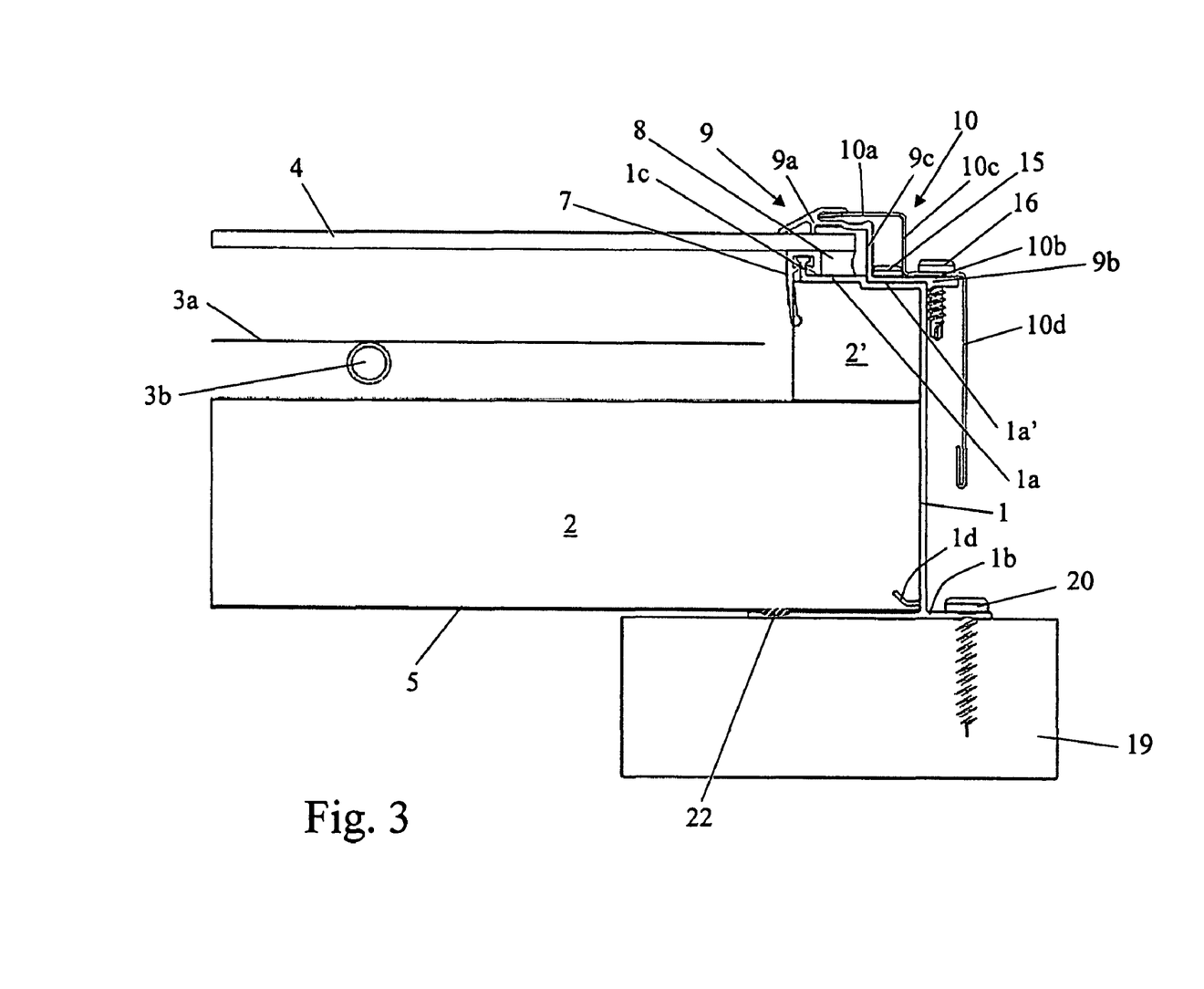
FIG. 3 is a cross-sectional view through one of the side panels of a solar collector in accordance with the present invention.

With reference to FIG. 3 the side- and end panels 1 profile with an upper inwardly directed attachment ledge 1a and a bottom inwardly and outwardly directed ledge or foot 1b (the attachment ledge may also include an outwardly direct part, not shown). The inner end of the upper ledge 1a is provided with an upstanding rim 1c.

The upstanding rim 1c acts as a spacer that supports the cover pane 4 and maintains a distance between the upper surface of ledge 1a and the bottom surface of the cover pane 4 during fitting of the cover pane. A continuous EPDM neoprene gasket 7 is placed on the upstanding rims 1c. The gasket 7 is in sealing abutment with a peripheral zone of the bottom surface of the cover pane 4 to form a moisture barrier protecting the enclosure and to insulate the cover pane 4 thermally from the end- and side panels 1.

When the gasket has been placed on the rim 1c, the cover pane 4 is placed on top of the gasket 7 and the space between the upper side of the attachment ledge 1a and the bottom surface of the cover pane 4 is filled with a flexible adhesive sealant such as a silicone based sealant in liquid form. The gasket 7 also serves as a barrier preventing the liquid flexible adhesive sealant from entering the cavity when it is applied.

When the sealant has cured it forms a flexible layer 8 that securely attaches the cover pane 4 to the end- and side panels 1. The layer of flexible adhesive sealant 8 also forms a second moisture barrier protecting the enclosure.

The layer of flexible adhesive sealant 8 attaches the cover pane 4 to the side panels so that the cover pane 4 becomes an integral bearing part of the construction that contributes to the overall stability and stiffness of the solar collector.

The upper or cover pane attachment ledge 1a includes an attachment portion to which said flexible adhesive sealant 8 is attached and a shoulder portion Ia' on which the bottom ledge 9b of said protective stripping rests. The shoulder portion Ia' is arranged slightly lower than the attachment portion Ia so that a ridge is formed at the transition between the shoulder portion Ia' and the attachment portion 1a. The ridge facilitates mounting of the protective stripping 9 on the frame since the ridge that acts as an abutment face that facilitates the positioning of the protective striping while it is being fastened.

The collector is provided with a protective stripping 9. The protective stripping 9 has a top ledge 9a covering the upper edge of the cover pane 4 and a bottom ledge 9b resting on and supported by the attachment ledge 1a. The top ledge 9a is connected to the bottom ledge 9b by a substantially upright extending connection portion 9c. The connection portion is spaced from the side surfaces of the cover pane so as to allow movements of the side surfaces of the cover pane 4 during transport or caused by thermal expansion, without getting into contact with the protective stripping.

The bottom ledge 9b is fastened to the attachment ledge 1a by means of fasteners 15 such as screws or pop-rivets that are spaced along the length of the panels 1. Alternatively, the protective stripping may be secured to the panels by a snap fit system.

The free extremity of the top ledge 9a is slightly sloping downwards towards the cover pane 4 so that only its tip abuts with the cover pane 4, thus avoiding that water can get trapped between the top ledge 9a and the cover pane 4.

The top ledge 9a also includes an outwardly facing U-shaped recess in which a part of a flashing 10 is received. The flashing includes an inwardly directed top ledge 10a, a shoulder or intermediate ledge 10b, and a substantially upright connecting portion 10c connecting the top ledge 10a with the intermediate ledge 10b. The shoulder 10b rests on, and is supported by, the bottom ledge 9b of the protective stripping.

The connecting portion 10c of the flashing 10 is arranged substantially parallel with the connecting portion 9c of the protective stripping with a given clearance therebetween so as to provide space for the fastening elements that fasten the bottom ledge 9b of the protective stripping to the attachment ledge 1a of the end- and side panels 1.

The flashing 10 includes a skirt 10d projecting downwardly from the shoulder 10b to ensure that water running down from the cover pane 4 is guided onto the roof (not shown) or into a juxtaposed flashing (not shown).

The protective stripping 9 forms a redundant means of securing the cover pane 4 to the frame 1 that will prevent the cover pane 4 from falling should the silicon connection 8 between the frame 1 and the cover pane 4 against expectations ever fail.

The cover pane 4 is in all the described embodiments preferably made from tempered glass, i.e. a strong and durable glass quality. However, the edges of the pane are particularly sensitive to mechanical impact and could be damaged by objects hitting the edge (e.g. hailstones), leading to a chipped or cracked cover pane. The protective stripping 9 protects the cover pane 4 from mechanical impact. The protective stripping 9 also serves to protect the silicon layer 8 from weather influences such as moist and direct sunlight. A ventilation space is provided between the protective stripping 9 and the silicon layer 8.

The backsheet 5 is suitably made of metal and its peripheries are received in a recess between the inwardly projecting part of the bottom ledge 1b and an additional inwardly projecting guiding ledge 1d. The guiding ledge 1d has an upwardly sloping tip to facilitate the entry of the periphery of the backsheet 5 into the recess between the bottom ledge 1b and the guiding ledge 1d.

The backsheet 5 is fastened to the inwardly projecting part of the bottom ledge 1b by means of a weld 22 or a TOXING connection (not shown). The inwardly projecting part of ledge 1b projects further inside than the attachment ledge 1a, thus allowing a substantially C-shaped welding or TOXING tool (not shown) to engage the upper side of the backsheet 5 and the underside of the bottom ledge 1b simultaneously. A series of spaced welds or TOXING connections 22 distributed along the length of the end- and side panels 1 ensure a solid connection between the backsheet 5 and the frame.

The outwardly projecting part of the bottom ledge or foot 1b is provided with a series of spaced bores distributed along the length of the side- and end panels 1. The solar collector is supported by the battens 19 of a roof structure and secured to the battens 19 by means of bolts or screws 20.

Figure 4:
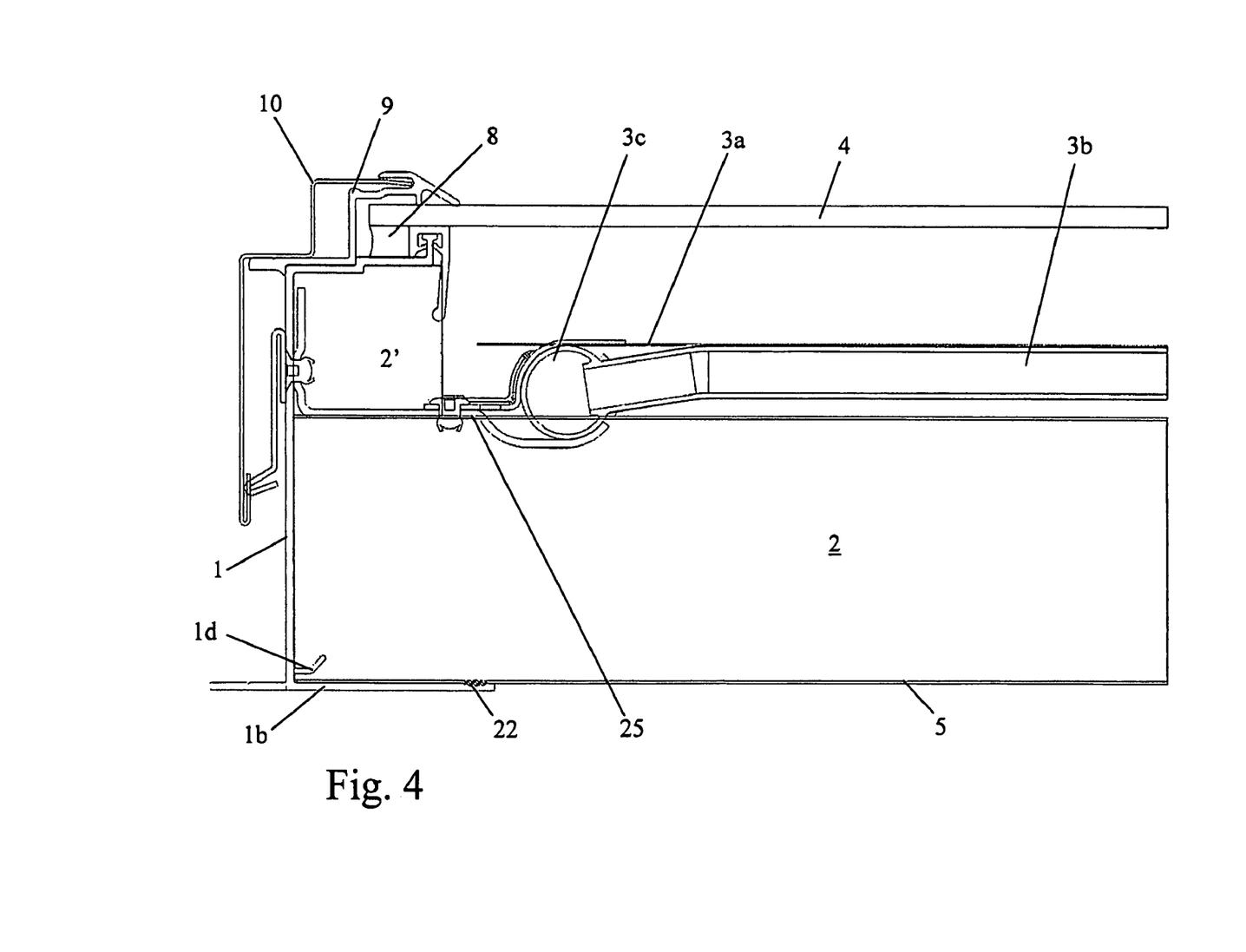
FIG. 4 is a cross-sectional view through the lower end panel of a solar collector in accordance with the present invention.

FIG. 4 is a cross-sectional view through the lower (lower as in a solar collector mounted on a pitched roof or on a pitched frame) end panel 1. The construction of the lower end panel 1 is identical to that of the side panels 1, as is the construction of the protective stripping 9, the flashing 10, the bottom ledge 1b and its connection to the backsheet 5. A mounting bracket 25 engages the absorber tubes 3c in order to hold the absorber in place.

Figure 5:
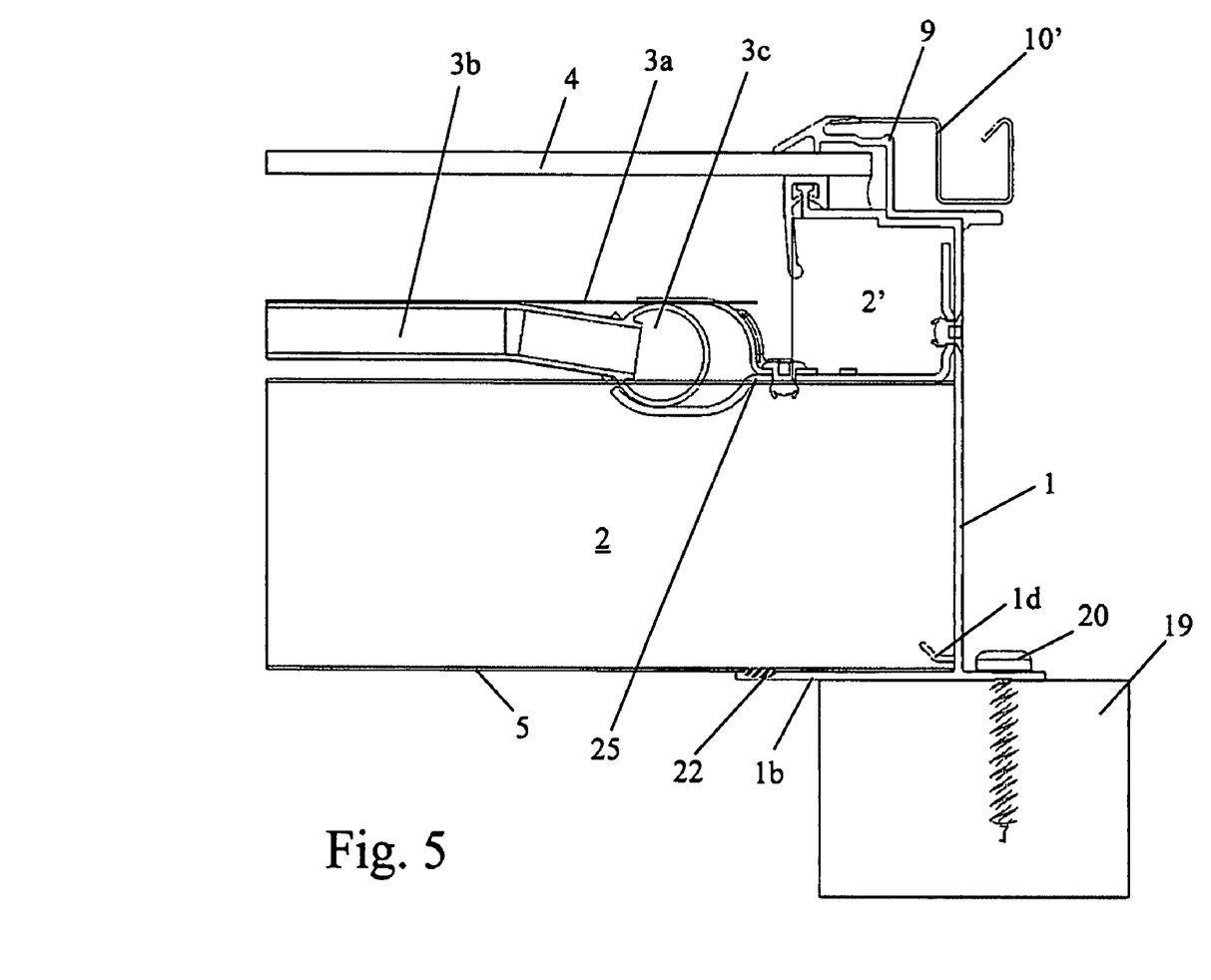
FIG. 5 is a cross-sectional view through the upper end panel of a solar collector in accordance with the present invention.

FIG. 5 is a cross-sectional view through the upper (upper as in a collector mounted on a pitched roof or on a pitched frame) end panel 1. The construction of the upper end profile is identical to that of the side panels 1, as is the construction of the protective stripping 9, the bottom ledge 1b and its connection to the backsheet 5. However, the construction of the flashing 10 is modified, in order to be able to cooperate with another flashing (not shown) that covers the periphery of the roof portion just above the solar collector. Hereto, the flashing comprises and upwardly projecting skirt 10' so as to from a U-shaped channel together with the intermediate ledge 10b and the connection portion 10c. The upper end profile 10' with the U-shaper channel extends along the complete upper profile and from there for short distance along the side panels to guide rainwater along the sides of the solar panel.

The protective stripping 9 may extend along the complete periphery of the cover pane 4.

A downwardly projecting skirt of the flashing (not shown) that covers the roof portion directly above the solar collector extends at least partially into the U-shaped channel so that any water running down from the roof above the solar collector is guided into the U-shaped channel. The upper edge of the skirt 10d' is bent back to provide for an attachment lip that may engage a corresponding lip of the roof flashing (not shown)

Figure 6:
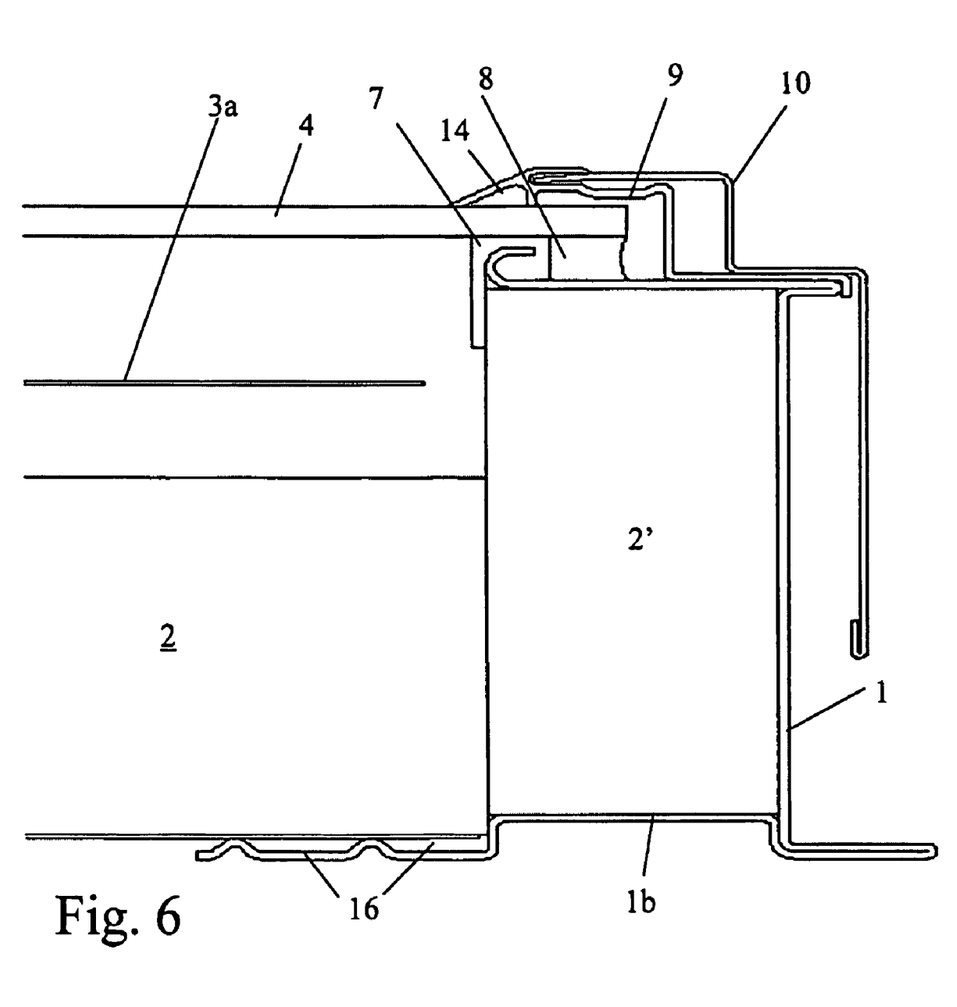
FIG. 6 is a cross-sectional view through a side panel of another collector in accordance with the present invention.

FIG. 6 is a cross-sectional view through the side panel of an alternative embodiment of the invention. This embodiment is essentially the same as the embodiments described above, except that the profile 1 is roll formed. Further, bottom ledge 1b is provided with indentations to provide for a space 16 between the backsheet 5 and the bottom ledge 1b that is filled with the silicon or other adhesive to establish a sealing connection between the backsheet 5 and the bottom ledge 1b. The outwardly directed portion of the bottom ledge 1b is provided with spaced through going bores for receiving fasteners therein for fastening the collector to a roof construction there below.

Although the present invention has been described in detail for purpose of illustration, it is understood that such detail is solely for that purpose, and variations can be made therein by those skilled in the art without departing from the scope of the invention.

The invention claimed is:

1. A solar collector comprising:
an absorber,
an insulating layer (2) beneath the absorber,
a cover pane (4) spaced above the absorber,
an outer frame having end- and side panels (1) surrounding the absorber and the periphery of the insulating layer (2), and
a cover pane attachment ledge (1a) directed inwardly and/or outwardly from the end- and side panels (1) adjacent to their upper ends,
a protective stripping (9) with a top ledge (9a) covering a peripheral zone of the upper side of the cover pane (4),
said cover pane (4) being adhesively attached to said attachment ledge (1a) by a layer of adhesive (8),
said cover pane attachment ledge includes an attachment portion (1a) to which said layer of adhesive (8) is adhesively connected and said cover pane attachment ledge includes a shoulder portion (1a') on which said protective stripping (9) rests, a ridge at the transition between the shoulder portion (1a') and the attachment portion (1a) connects the shoulder portion (1a') to the attachment portion (1a) and the ridge between the shoulder portion (1a') and said attachment portion (1a) forms an abutment face facilitating the positioning of the protective stripping (9).

2. A solar collector according to claim 1, wherein said top ledge (9a) is interconnected to a bottom ledge (9b) by a substantially vertically extending connection portion (9c).

3. A solar collector according to claim 2, wherein said bottom ledge (9b) is fastened to said attachment ledge (1a).

4. A solar collector according to claim 1, wherein said protective stripping (9) is provided with means to connect to a flashing (10).

5. A solar collector according to claim 4, wherein said means for connecting a flashing (10) to the protective stripping include an outwardly facing U-shaped recess formed in the protective stripping (9).

6. A solar collector according to claim 5, further comprising a flashing (10), said flashing comprising an inwardly directed top ledge (10a), a shoulder (10b), and a substantially upright connecting portion (10c) connecting said top ledge with said shoulder.

7. A solar collector according to claim 6, wherein said shoulder (10b) is supported by said bottom ledge (9b) of the protective stripping (9).

8. A solar collector according to claim 7, wherein said connecting portion of said flashing (10) extends in parallel with the connecting portion of said protective stripping (9) with a given clearance therebetween so as to provide space for fastening elements that fasten the bottom ledge (9b) of the protective stripping to the attachment ledge (1a) of the end- or side panel.

9. A solar collector according claim 6, wherein said flashing (10) further includes a skirt (10d) projecting downwardly from said shoulder (10b).

10. A solar collector according to claim 6 wherein the inner perimeter of the inwardly directed top ledge (10a) of the flashing (10) is received in said U-shaped recess.

11. A solar collector according to claim 6, wherein the cover pane (4) is attached to the outer frame by a continuous layer of flexible adhesive sealant (8) between a peripheral zone on the underside of the cover panel and the upper surface of the attachment ledge (1a).

12. A solar collector according to claim 11, wherein said cover pane attachment ledge (1a) includes an attachment portion to which said flexible adhesive is attached and a shoulder (1a') portion on which the bottom ledge (9b) of said protective stripping (9) rests.

13. A solar collector according to claim 6, wherein the cover pane attachment ledge (1a) is directed inwardly and is provided with an upstanding rim (1c).

14. A solar collector according to claim 13, wherein a gasket (7) is placed on the upstanding rim (1c).

15. A solar collector according to claim 1, wherein the protective stripping (9) is fastened to the inwardly directed portion of the attachment ledge (1a).

16. A solar collector according to claim 15, wherein a flashing (10) is fastened to the outwardly directed portion of the attachment ledge (1a).

* * * * *